Patented Feb. 14, 1933

1,897,856

UNITED STATES PATENT OFFICE

CARL R. NOLLER, OF ROCHESTER, NEW YORK, ASSIGNOR TO EASTMAN KODAK COMPANY, OF ROCHESTER, NEW YORK, A CORPORATION OF NEW YORK

MANUFACTURE OF POLYMERIZED VINYL ALCOHOL

No Drawing. Application filed February 6, 1929. Serial No. 338,046.

This invention relates to the manufacture of polymerized vinyl alcohol.

The known procedure for the manufacture of polymerized vinyl alcohol consists in the saponification of an alcoholic solution of polymerized vinyl acetate with alcoholic sodium or potassium hydroxide. Polymerized vinyl alcohol is insoluble in alcohol and precipitates in heavy tough curds. These curds prevent complete saponification and thus interfere with the reaction and limit the efficiency of the procedure. Moreover, the curds are washed with considerable difficulty and it is practically impossible to remove the excess alkali therefrom.

It is the object of the present invention to provide an improved process wherein the precipitation of the tough curds is prevented. The reaction is thus facilitated and the product obtained can be washed easily. The efficiency of the process and the character of the product are greatly improved.

Polymerized vinyl alcohol is soluble in water, and I have discovered that by the addition of a suitable proportion of water to the saponification mixture during the hydrolysis the precipitation of tough curds can be avoided. An excess of water should not be employed, but the presence of water in proportion to accomplish the purpose of the invention does not interfere with the reaction. On the other hand, it facilitates the saponification and the separation and washing of the desired product.

The amount of water or other solvent used should be adjusted therefore so that when the reacting substances have been mixed, the polymerized vinyl alcohol formed in the reaction mixture will be just at the point of precipitation. When the reaction has proceeded sufficiently, the reaction mixture may be poured into a large volume of alcohol or any suitable non-solvent of the polymerized vinyl alcohol. The effect of the solvent for polymerized vinyl alcohol is thus overcome and it precipitates therefore. The precipitate is, however, in a finely divided form in which condition it can be removed readily from the solution. The relatively fine division of the precipitate and the absence of curds facilitates separation, which can be accomplished by centrifuging or filtration. The product is easily washed with alcohol to remove the excess of alkali so that the product is obtained in a substantially pure condition suitable for the purposes to which it is adapted.

As an example of the procedure, 4.5 kg. of polymerized vinyl acetate is dissolved in 30 kg. of ethyl alcohol. This is added with vigorous stirring to a solution of 4.5 kg. of water, 2.8 kg. of sodium hydroxide or its equivalent of potassium hydroxide, and 10 kg. of alcohol, at such a rate that no lumps or precipitate forms. As soon as a precipitate begins to form which does not redissolve on stirring, approximately 10 kg. of hot water are added and then the balance of the polymerized vinyl acetate solution. This mixture is added at once with stirring to 40 kg. of alcohol and allowed to stand for approximately 12 hours at 25° C. The polymerized vinyl alcohol precipitates and may be separated from the solution in any suitable manner. It is washed with alcohol until substantially free from alkali and salts and is then ready for use.

The foregoing example is illustrative merely of the procedure, it being understood that the proportions may vary and that the proportion of water particularly may be modified to meet the particular conditions of the reaction, the amount of water present, as hereinbefore indicated, being such as to hold the polymerized vinyl alcohol in solution at a point where it is just about to precipitate. Modifications may be made therefore within the scope of the accompanying claims without departing from the invention or sacrificing any of its advantages.

Having thus described my invention, what I claim as new and desire to secure by Letters Patent is:

1. The process of preparing polymerized vinyl alcohol which comprises saponifying polymerized vinyl acetate with an alkali metal hydroxide in the presence of an alcohol and a sufficient amount of water to prevent precipitation of the polymerized vinyl alcohol and thereafter precipitating the polymerized vinyl alcohol by diluting the mixture with alcohol.

2. The process of preparing polymerized vinyl alcohol which comprises saponifying polymerized vinyl acetate with an alkali metal hydroxide in a solvent common to both and in the presence of a sufficient amount of water to prevent precipitation of the polymerized vinyl alcohol and thereafter precipitating the polymerized vinyl alcohol by diluting the mixture with a non-solvent therefor.

3. The process of preparing polymerized vinyl alcohol which comprises saponifying polymerized vinyl acetate with an alkali metal hydroxide in a solvent common to both and in the presence of a sufficient amount of water and maintaining the water in such amount that a substantially lower concentration would precipitate the polymerized alcohol therefrom while a substantially greater concentration would cause the precipitation of unsaponified polymerized vinyl acetate.

Signed at Rochester, New York this 31st day of January 1929.

CARL R. NOLLER.